3,320,122
CONTROLLING FUNGI WITH α-ETHYNYL-1-NAPHTHALENEMETHANOL OR α-ETHYNYL-2-NAPHTHALENEMETHANOL
Alan J. Lemin, Richland Township, Kalamazoo County, Mich., assignor to The Upjohn Company, Kalamazoo, Mich., a corporation of Delaware
No Drawing. Filed May 31, 1960, Ser. No. 32,518
8 Claims. (Cl. 167—32)

This invention relates to novel chemical compounds and to compositions thereof and is more particularly concerned with the novel chemical compounds α-ethynyl-1-naphthalenemethanol and α-ethynyl-2-naphthalenemethanol and with compositions and methods which employ these compounds as active agents in the control of fungi.

The novel compounds of the invention can be represented by the formula:

(I)

wherein R is selected from the class consisting of 1-naphthyl and 2-naphthyl.

The compounds having the Formula I can be prepared conveniently by reacting the appropriate aldehyde R—CHO, where R has the significance hereinbefore described, with sodium acetylide in the presence of liquid ammonia using the procedure described by Campbell et al., J. Am. Chem. Soc., 60, 2882 (1938) for the preparation of α-ethynylbenzyl alcohol from sodium acetylide and benzaldehyde.

I have now found that the compounds having the Formula I are effective in the control of seed-borne and soil-borne fungi, especially these of the Rhizoctonia, Pythia, Sclerotinia, Phytopthora, Collelotrichia, Sclerotia, and Fusaria genera, for example, *Rhizoctonia solani, Pythium debaryanum, Pythium ultimum, Sclerotinia sclerotiorum, Phyopthora cactorum, Colletotrichum lindemuthianum, Sclerotium rolfsii,* and *Fusarium culmorum.* Seeds which are planted in soil infected with such organisms are attacked by the latter. In many instances germination of the seeds is prevented entirely and, even where germination occurs, the resulting seedlings often do not develop into healthy plants. Frequently seeds such as those of cotton, peas, corn, wheat, and beans become infected by the fungi during harvesting or during storage and such seeds, when planted in soil which itself is not infected, fail to germinate or give rise to seedlings which do not develop into healthy plants.

I have found that seeds, which have been or are liable to become infected with fungi before planting or which are to be planted in soil infected with fungi, can be protected from attack by said fungi by application of a fungicidally effective amount of a compound having the Formula I to the seeds before planting. I have also found that soil which is infected with fungi can be treated with a fungicidally effective amount of a compound having the Formula I and the soil so treated can be used to grow plants from seeds which in the untreated soil would have failed to germinate or would have given rise to infected plants.

Accordingly, the process of the invention comprises a method for the control of fungal infestations of seed and of soil which comprises applying to the locus to be treated a fungicidally effective amount of a compound having the Formula I.

In order to achieve effective control of fungi of the kind noted above by application of a compound having the Formula I to seeds which are themselves infected with fungi or which are to be planted in soil infected with said fungi, it is necessary to treat the seeds with a compound having the Formula I, advantageously using formulations such as those to be described hereinafter, at a rate of about 0.25 ounce to about 10 ounces of compound having the Formula I per bushel of seed. Preferably the amount of compound having the Formula I employed is about 1 ounce to about 2 ounces per bushel of seed.

In the treatment of soil according to the process of the invention in order to obtain effective control of fungal infestations therein, it is necessary to apply to the soil, using formulations such as those to be described hereinafter, an amount of a compound having the Formula I within the range of about 0.5 pound to about 20 pounds per acre. Preferably the amount of compound having the Formula I applied to the soil is within the range of about 2 pounds to about 6 pounds per acre.

The fungicidal compositions of the invention comprise dusts, dispersible powders, aqueous dispersions, emulsifiable concentrates, and oil-in-water emulsions in which a compound having the Formula I is present as the active fungicidal agent.

The fungicidal dusts of the invention comprise a compound having the Formula I dispersed in an inert dusting powder such as pyrophyllite, diatomite, clays such as bentonite, Georgia clay, Attapulgus clay, Barden clay, wood or walnut shell flour, and the like. Dusting powder is understood to be a solid material comminuted so that it has an average particle size of less than 5 microns, advantageously less than 15 microns.

The fungicidal dusts of the invention can be prepared conveniently by adding to the solid diluent a solution of a compound having the Formula I in a volatile solvent such as ethanol, acetone, ether, and the like, mixing to form a paste, drying, and milling. The amount of compound having the Formula I present in the dusting powders is advantageously of the order of about 1 percent to about 90 percent and is preferably of the order of about 5 percent to about 25 percent by weight.

The fungicidal dusts prepared as described above are particularly suitable for the treatment of seeds but can also be used in the treatment of soil. When so used in the treatment of soil, the fungicidal dusts of the invention can also include soil fertilizers in order that fertilization and treatment of the soil to control fungi can be accomplished in a single operation.

The dispersible powders of the invention comprise a compound having the Formula I, an inert dusting powder as hereinbefore defined, and a surfactant. As surfactant there can be used any of the conventional wetting and dispersing agents of the anionic, cationic, and nonionic types that are commonly employed in compositions for controlling fungal infections in horticulture and agriculture. Suitable surfactants having sufficient wetting and/or dispersing activity for the purposes of this invention include alkyl sulfates and sulfonates, alkylbenzenesulfonates, sulfosuccinate esters, polyoxyethylene sulfates, polyoxyethylene sorbitan monolaurate, alkylarylpolyether alcohols, alkylnaphthalenesulfonates, alkyl quaternary ammonium salts, sulfated fatty acid esters, sulfated fatty acid amides, glycerol mannitan laurate, polyalkylether condensates of fatty acids, and ligninsulfonates, the sulfates and sulfonates, of course, being used in the form of their soluble salts, for example, the sodium salts. All these surfactants are capable of reducing the surface tension of water to less than about 40 dynes per cm. in concentrations of about 1 percent or less.

The concentration of compound having the Formula I present in the dispersible powders is of the same order as in the dusts described above.

The aqueous dispersions of the invention comprise a compound having the Formula I, a surfactant, and water, and can be prepared by diluting the above-described dispersible powders with water, or by dissolving a compound having the Formula I in a water-miscible solvent such as acetone, dimethylformamide, dimethyl sulfoxide, and the like, containing a surfactant, and pouring the resulting solution into water. The aqueous dispersions so obtained can be used in the treatment of seeds, the seeds being dried after treatment, or more suitably, can be employed in the treatment of soil for the control of fungal infestations. The concentration of compound having the Formula I which is present in the aqueous dispersions for the treatment of soil can be varied over a wide range to meet the needs of the spraying machine employed in the application thereof; advantageously, the concentration of compound having the Formula I in the aqueous dispersions falls within the range of about 500 p.p.m. and about 10,000 p.p.m. When the aqueous dispersions are employed for the treatment of seed, the concentration of compound having the Formula I is generally higher, and advantageously is of the order of 5 to 45 percent by weight.

The compositions of the invention also include emulsifiable concentrates and the oil-in-water emulsions obtained by pouring said concentrates into water. The emulsifiable concentrates comprise a compound having the Formula I in solution in a mixture of a surfactant and a water-immiscible solvent such as cyclohexanone, aromatic hydrocarbons, for example, benzene, toluene, xylene, and the like, and high boiling petroleum hydrocarbons such as kerosene, diesel oil, and the like. The concentration of compound having the Formula I in the emulsifiable concentrates is advantageously of the order of about 20 percent to about 80 percent by weight. The concentration of compound having the Formula I in the oil-in-water emulsions obtained by diluting the emulsifiable concentrates with water can be varied over a wide range to meet the needs of the spraying machine employed in the application thereof. Advantageously, the concentration of compound having the Formula I in the oil-in-water emulsions falls within the range of about 500 p.p.m. to about 10,000 p.p.m.

The oil-in-water emulsions of the invention are particularly suitable in the treatment of soil for the control of fungal infestations. Both the aqueous dispersions and the oil-in-water emulsions can be applied to soil using conventional spraying machines of the landborne or airborne type.

Advantageously, the oil-in-water emulsions and the aqueous dispersions are applied to the soil at the time at which the seeds are planted or shortly after the seeds have been planted. Thus the liquid formulations can be applied to the furrow in which the seeds are to be planted, the application of the liquid formulation and the planting of the seeds being accomplished in a continuous operation. Alternatively, after the seeds have been planted, the liquid formulations can be applied to the soil in a band on either side of the row in which the seeds have been planted. The liquid formulations of the invention can also be applied as soil drenches by methods known in the art.

The compositions of the invention also include compositions in which a compound having the Formula I is employed in combination with known fungicides. Such known fungicides include N-(trichloromethylthio)-1,2,3,6-tetrahydrophthalimide (Captan), 3-[2-(3,5-dimethyl-2-oxocyclohexyl) - 2 - hydroxyethyl]glutarimide (cycloheximide), 2,3-dichloro-1,4-naphthoquinone (dichlone), tetrachloro-p-benzoquinone (chloranil), pentachloronitrobenzene, ferric dimethyldithiocarbamate (Ferbam), disodium ethylenebis[dithiocarbamate] (Nabam), manganous ethylenebis[dithiocarbamate] (Maneb), zinc ethylenebis[dithiocarbamate] (Zineb), tetramethyl thiuram disulfide, etc.

The following examples are illustrative of the process and products of the present invention, but are not to be construed as limiting.

*Example 1.—α-Ethynyl-1-naphthalenemethanol*

Acetylene (dried by bubbling through concentrated sulfuric acid) was bubbled into 400 ml. of liquid ammonia in a three-neck flask maintained in a solid carbon dioxide-acetone cooling bath and fitted with stirrer, addition funnel, and a condenser containing solid carbon dioxide. The liquid ammonia was stirred and after the passage of acetylene had been in progress for 5 min. the addition of 9.69 g. (0.33 mole) of sodium was made portionwise. The passage of acetylene was continued throughout this operation and also for 1 hour after the addition of sodium was completed. To the solution so obtained was added slowly a solution of 28.12 g. (0.3 mole) of 1-naphthaldehyde in 150 ml. of ether. After the addition was complete the mixture was stirred without cooling for 2 hours, the volume of the contents of the reaction vessel being maintained substantially constant by the addition of anhydrous ether as required. To the mixture was then added 37.5 g. of powdered ammonium chloride followed by water until all the solid had disappeared. The ethereal layer was then separated and washed successively with three 500-ml. portions of water, 500 ml. of dilute sulfuric acid, and two 500-ml. portions of water. The washed solution was dried over anhydrous sodium sulfate and the dried solution was filtered. The filtrate was evaporated and the residue was distilled under reduced pressure. The fraction boiling at a temperature of 134 to 136° C. at a pressure of 0.5 mm. of mercury was collected. This fraction solidified on cooling. There was thus obtained α-ethynyl-1-naphthalenemethanol in the form of a solid having a melting point of 58.5 to 59° C.

*Analysis.*—Calcd. for $C_{13}H_{10}O$: C, 85.69; H, 5.53. Found: C, 85.33; H, 5.92.

*Example 2.—α-Ethynyl-2-naphthalenemethanol*

Using the procedure described in Example 1, but substituting 2-naphthaldehyde for 1-naphthaldehyde, there was obtained α-ethynyl-2-naphthalenemethanol.

*Example 3.—Emulsifiable concentrate*

An emulsifiable concentrate was prepared by dissolving 10 g. of α-ethynyl-1-naphthalenemethanol and 0.5 g. of Agrimul N4R (an alkylarylpolyether alcohol) in sufficient isopropyl alcohol to make 70 ml. of solution. The concentrate so obtained was diluted with 2.43 l. of water to form an aqueous emulsion containing 4000 p.p.m. of α-ethynyl-1-naphthalenemethanol. The aqueous emulsion so obtained was applied to soil at the rate of 30 gallons per acre to control fungal infestations therein before planting of peas and corn.

The α-ethynyl-1-naphthalenemethanol employed in the above formulation can be replaced by α-ethynyl-2-naphthalenemethanol.

*Example 4*

A dispersible powder was prepared by milling 500 parts by weight of α-ethynyl-1-naphthalenemethanol, 450 parts by weight of Barden clay, and 50 parts by weight of Triton B-1956 (modified phthalic glycerol alkyd resin). The dispersible powder so obtained can be diluted with water to form an aqueous dispersion or can be used in the solid state in the treatment of seeds at a rate of 2 ozs. of powder per bushel of seeds.

I claim:

1. A process for the control of fungal infestations of seeds and of soil which comprises applying to the locus to be treated a fungicidally effective amount of a compound selected from the class consisting of α-ethynyl-1-naphthalenemethanol and α-ethynyl-2-naphthalenemethanol.

2. A process for the control of fungal attack on seeds both before and after planting which comprises contacting the seeds with a fungicidally effective amount of a compound selected from the group consisting of α-ethynyl-1- naphthalenemethanol and α-ethynyl-2-naphthalenemethanol.

3. A process for the control of fungal infestations of soil which comprises applying to the soil a fungicidally effective amount of a compound selected from the class consisting of α-ethynyl-1-naphthalenemethanol and α-ethynyl-2-naphthalenemethanol.

4. A fungicidal composition which comprises a fungicidally effective amount of a compound selected from the class consisting of α-ethynyl-1-naphthalenemethanol and α-ethynyl-2-naphthalenemethanol dispersed in a carrier consisting of water containing a surfactant.

5. A fungicidal composition in the form of an emulsifiable concentrate which comprises a surfactant, a water-immiscible solvent, and a fungicidally effective amount of a compound selected from the class consisting of α-ethynyl-1-naphthalenemethanol and α-ethynyl-2-naphthalenemethanol.

6. A fungicidal composition in the form of a concentrate adapted to form an aqueous dispersion on dilution with water which comprises a surfactant, a water-miscible solvent, and a fungicidally effective amount of a compound selected from the class consisting of α-ethynyl-1-naphthalenemethanol and α-ethynyl-2-naphthalenemethanol.

7. A fungicidal composition in the form of a dispersible powder which comprises a surfactant, an inert solid diluent, and a fungicidally effective amount of a compound selected from the class consisting of α-ethynyl-1-naphthalenemethanol and α-ethynyl-2-naphthalenemethanol.

8. A fungicidal composition in the form of a dusting powder which comprises an inert solid diluent and a fungicidally effective amount of a compound selected from the class consisting of α-ethynyl-1-naphthalenemethanol and α-ethynyl-2-naphthalenemethanol.

References Cited by the Examiner

UNITED STATES PATENTS

| | | | |
|---|---|---|---|
| 2,616,220 | 11/1952 | Welch | 47—58 |
| 2,651,886 | 9/1953 | Mowry et al. | 47—58 |
| 2,796,443 | 6/1957 | Meyer et al. | 260—618 |
| 2,804,479 | 8/1957 | Kabisch et al. | 260—618 |
| 2,904,465 | 9/1959 | Moorefield | 167—32 |
| 2,935,440 | 5/1960 | Lamb et al. | 167—32 |

OTHER REFERENCES

Tanaka et al.: Antibiotics and Chemotherapy (March 1959), 5 pages.

ELBERT L. ROBERTS, *Primary Examiner.*

CHARLES B. PARKER, MORRIS O. WOLK,
*Examiners.*

LEWIS GOTTS, H. G. MOORE, D. MOYER,
*Assistant Examiners.*